United States Patent [19]
Liggat et al.

[11] Patent Number: 5,874,040
[45] Date of Patent: Feb. 23, 1999

[54] PROCESSING OF POLYESTERS

[75] Inventors: John Jamieson Liggat, Rutherglen, United Kingdom; Gregory O'Brien, Portsmouth, R.I.

[73] Assignee: Monsanto Company, St. Louis, Mo.

[21] Appl. No.: 892,311

[22] Filed: Jul. 14, 1997

Related U.S. Application Data

[63] Continuation of Ser. No. 553,644, filed as PCT/GB94/01183, Jun. 1, 1994, published as WO94/28049, Dec. 8, 1994, abandoned.

[30] Foreign Application Priority Data

Jun. 2, 1993 [GB] United Kingdom ............ 9311400

[51] Int. Cl.$^6$ ................ B32B 17/00; C08F 6/00
[52] U.S. Cl. ............ 264/346; 528/361; 528/502; 528/503; 264/176.1; 264/211.12; 264/331.11
[58] Field of Search .................. 528/361, 502, 528/503; 264/176.1, 211.12, 331.11, 346

[56] References Cited

FOREIGN PATENT DOCUMENTS 2 160 208  12/1985  United Kingdom .
94/17121    8/1994  WIPO .

OTHER PUBLICATIONS

Saiki, et al: "Stretching of poly (beta–hydroxybutyric acid) molding", Chemical Abstracts, vol. 105, No. 14, Oct. 6, 1986, abstract No. 116100 & JP,A,61 069 431, Apr. 10, 1986.

De Koning, et al: "Crystallization phenomena in bacterial poly[(R)–3–hydroxybutyrate]: 2. Embrittlement and rejuvenation", Polymer, Nol 34, No. 19, 1993, pp. 4089–4094.

*Primary Examiner*—Samuel A. Acquah
*Attorney, Agent, or Firm*—Gary M. Bond; Arnold, White & Durkee

[57] ABSTRACT

Process for improving mechanical properties of an aged polyester composition consisting essentially of copolymer of hydroxybutyrate units and hydroxyvalerate units which comprises heating the polyester at a temperature whereby (i) the polyester is restored to its original non-aged properties, and (ii) subsequent ageing of the polyester is retarded as indicated by substantial improvement of at least one measurement indicative of ageing compared to non heat treated polyester of the same age. The invention includes the polyester composition and shaped articles which have been subjected to the process and in which ageing is retarded.

7 Claims, No Drawings

PROCESSING OF POLYESTERS

This is a continuation of application Ser. No. 08/553,644, filed on Mar. 8, 1996, which was abandoned upon the filing hereof Jul. 14, 1997.

This application claims benefit of international application PCT/GB94/01183, filed Jun. 1. 1994

This invention relates to shaped polyester articles restored and stabilised in properties after ageing and to a process of de-ageing them.

Whereas shaped articles made of the polyester poly[(R)-3-hydroxybutyrate] (PHB) and copolymers of [(R)-3-hydroxybutyrate] with [(R)-3-hydroxyvalerate] (PHBV) when freshly moulded show ductile behaviour, ageing seriously embrittles them and hampers their applicability. Within several weeks of storage at room temperature, the tensile modulus doubles, and the elongation at break drops below 10%. A mild de-ageing treatment administered to PHB by the employment of heat up to 70° C. results in a slight and temporary improvement in mechanical properties.

It has now been found that such ageing can be reversed by a defined heat treatment and the so-treated articles are less subject to subsequent ageing.

According to the present invention a process for producing, by extrusion, production of film, injection moulding, thermoforming, fibre spinning or blow moulding, an embrittlement-resistant shaped article at least partly made of polyhydroxyalkanoate (PHA), is characterised by the succession of steps:

(a) using as said PHA a plasticiser-free microbiologically produced polyester in the (R)-3-hydroxy form having units of formula —O—$C_mH_n$—CO— where n is 2 m; and m is 4 to the extent of 4–20 mol %, the balance being m=3 units;

(b) shaping said PHA;

(c) ageing the resulting shape for the equivalent of at least 24 h at 20° C. until a deterioration by more than 50% has taken place in ductility as measured by percentage elongation to break and/or IZOD impact strength; and (d) heating the so-aged shape at a temperature in the range 100°–140° C. until its ductility as so measured has increased to at least 50° C. of its value before said ageing and has substantially stabilised at that increased level.

The invention provides also a process for improving and stabilising the mechanical properties of a shaped article at least partly made of plasticiser-free microbiologically produced polyester in the (R)-3-hydroxy form having units of formula —O—$C_mH_n$—CO— where n is 2 m and m is 4 to the extent of 4–20 mol %, the balance being m=3 units, in which ageing has occurred resulting in deterioration of ductility as measured by percentage elongation to break and/or IZOD impact strength; which process comprises heating it at a temperature in the range 100°–140° C. until its ductility as so measured has substantially increased and has substantially stabilised at that increased level.

A shaped article made for example by such a process and characterised by substantial stability of percentage elongation to break and/or IZOD impact resistance is believed to be novel.

"At least partly made" means having structural components made of PHBV to such an extent that ageing of the PHBV component ages the whole article. Thus for example, PHBV may be homogeneously mixed with other biodegradable polymers such as polylactides. In such mixtures the minimum amount of PHBV is at least 30% w/w. Also articles having PHBV components linked to other components such as razors and toothbrushes, and articles made of a matrix of some other biodegradable (e.g. starch) or non-biodegradable polymer (e.g. polypropylene) with PHBV inclusions, are within the invention. Articles made of PHBV alone, nucleated or otherwise, benefit most from the invention.

The PHBV may contain up to 1 mol percent of other oxyalkanoate units whether introduced deliberately or not.

"Substantial improvement" means that the measurement indicative of ageing, for example, elongation to break, is improved by 50% or more, preferably 70% or more, compared to the non-heat treated aged polyester at the same age as the heat treated aged polyester. The "same age" means the same period of ageing after the heat treatment i.e. one month after initial preparation of the polyester for the non heat treated polyester is the equivalent age to one month after heat treatment for the heat treated polyester.

By "restored to the original non-aged properties" is meant that the heat treatment restores at least 50% of the ductility of the original non-aged polyester as measured by conventional methods e.g. elongation to break, impact testing (IZOD). Preferably the heat treatment restores at least 75% of the ductility, especially 80% or more.

Aged polyester or shaped article in the present context means that it has the mechanical properties equivalent to the polyester or article having been stored for 24 hours or more at 20° C. Non-aged polyester or shaped article in the present context means that it has the mechanical properties equivalent to the polyester or shaped article having been freshly processed, i.e mechanical properties equivalent to storage for up to 24 hours at 20° C., preferably storage for up to and including 1 hour at 20° C. of having been processed.

The PHBV is capable of a relatively high level of crystallinity, for example over 30%, especially 50–90%. Fractional percentages of units may have higher values of m. The molecular weight Mw of the PHBV is for example from 50000 to $2 \times 10^6$, especially over 100000.

The copolymer may be a blend of two or more copolymers differing in the value of m. A particular example contains (a) PHBV consisting essentially of Formula I units in which 2–5 mol % of units have m=4, the rest m=3; and (b) PHBV consisting essentially of Formula I units in which 5–30 mol % of units have m=4, the rest m=3.

In each such copolymer blend the proportions are preferably such as give an average m=4 content in the range 4–20 mol %.

The PHBV can be a product of fermentation, especially of a microbiological process in which a microorganism lays down PHBV during growth or is caused to do so by cultivation in starvation of one or more nutrients necessary for cell multiplication. The microorganisms may be wild or mutated or may have the necessary genetic material introduced into it. Alternatively the necessary genetic material may be harboured by an eukaryote, to effect the microbiological process.

An example of suitable microbiological process is described in EP-A-69497 (*Alcaligenes eutrophus*) for Formula I material with m=3 or m=partly 3, partly 4.

The PHBV can be extracted from the fermentation product cells by means of an organic solvent, or the cellular protein material may be decomposed leaving microscopic granules of PHBV.

Typically the composition contains microbiologically produced PHBV to the extent of over 50% w/w, especially 80% w/w.

There may be present small amounts of the usual polymer processing additives such as particulate or fibrous or platy filler or reinforcer, fibres nucleating agents and pigments. The nucleant is preferably present in 0.1 to 10 phr, especially 1 to 5 phr, and may be for example, boron nitride, talc or ammonium chloride.

The properties of the article can be assessed using the following measurements: stress-strain curve including calculations of elongation to break, Young's modulus, and tensile strength; impact testing, for example IZOD; and dynamic mechanical thermal analysis (DMTA). These are all standard methods for testing mechanical properties.

Any one or more of the properties can be used to monitor the progress of the heat treatment. In practice it is often sufficient to test the polyester or article by taking a sample from a batch, cooling it to room temperature and subjecting it to manual flexing. In established manufacturing it is often possible to fix the heating temperature and then adopt a time that is fully adequate and affords a small margin to cover accidental variations.

A further advantage of the present invention is that after treatment the rate of ageing appears to get slower over a period of a few weeks indicating that substantial stability of measurements indicative of ageing often occurs faster in the heat treated polyester than the non heat treated polyester. As a consequence, substantial stability of such measurements occurs at a level significantly above that for the non heat treated polyester, i.e. the mechanical properties stabilise at a level substantially improved compared to the non heat treated polyester. Preferably, the mechanical properties stabilise at a level at least 50% improved compared to the same measurements taken on the non heat treated polyester of the same age.

The temperature to which the shaped article is heated, may be measured on the surface of the shaped article.

The heating time is typically at least a few seconds, preferably from 5 seconds to 20 hours, especially 0.5 min to 14 hours, particularly 0.5 min to 2 hours, after the article has reached the intended temperature. The heating time required for optimal effect is dependent on the heating temperature, i.e. the higher the temperature the less time that is required to achieve optimal effect. Also the temperature can be chosen to suit the characteristics of the copolymer of PHBV, the processing plant and economic requirements.

Heating can be effected in air or oxygen-depleted or inert gas or in vacuo, or in water or a fluid which does not interfere with the integrity of the polyester, or in a mould. Heat transfer can be by conduction, radiation, convection or resistive heating. Heat transfer methods may include ovens, water baths and hot rollers. A preferred form of heat transfer is by infra red radiation, for example, black body and quartz tubes. The shaped article is generally subjected to infra red radiation for 30 seconds to 15 minutes, preferably 30 seconds to 10 minutes.

The shaped articles may be run through the oven or other heating method on a continuous belt at a speed which is optimal to enable the shaped article to reach the correct temperature. A preferred method is to have a multi-zone system, preferably a 2 zone heat system in which the first zone gives a rapid rate of heating (i.e. the actual temperature in the zone may higher than that to be achieved by the shaped article) to bring it to the actual temperature required and then in the second zone the shaped article is maintained at the actual temperature to be achieved for the desired time period.

Processes for preparing shaped articles include for example, extrusion, production of film, coatings, injection moulding, thermoforming, fibre spinning and blow moulding.

The invention provides processes of shaping the polymer composition and the resulting shaped articles. The processes are mentioned above. Articles include fibres, films especially for packaging, coated products (such as paper, board, non-woven fabrics), fibres, non-woven fabrics, extruded nets, personal hygiene products, bottles and drinking vessels, agricultural and horticultural films and vessels, containers, disposable items such as ostomy bags, incontinence devices and wound care products, sustained release systems for drugs and agrochemicals and adhesives.

The invention is more particularly described, but not limited, by reference to the following examples.

EXAMPLE 1

Comparison of Aged and Heat Treated PHBV Containing 10 mol % Valerate Units

PHBV copolymer powder ("BIOPOL" supplied by ZENECA plc) having Mw 477,000, Mw/Mn 3.12 was mixed with 1.0% of boron nitride nucleating agent in a Hobart (RTM) mixer for about 10 min. The mixture was fed to a Betol 2520 (RTM) 25 mm screw extruder operated at maximum temperature of 150° C. with a screw speed of 100 rpm. The 4 mm strand so produced was crystallised at 60° C. in a water bath and granulated. The granules were injection-moulded into dumbbell-shaped specimens according to ISO R 537/2, their prismatic part measuring 40×5×12 mm using a Boy 15S (RTM) machine at a maximum barrel temperature 150° C., injection time 10 sec, screw speed 220 rpm, injection pressure 5 MPa, mould temperature 60° C., cooling time 30 sec. The specimens were allowed to age for at least 2 days at ambient temperature. Then the specimens were subjected to the following treatments:

(a) no further treatment (b) heated for 1 hour at 100° C.

(c) heated for 1 hour at 120° C.

(d) heated for 1 hour at 140° C.

The four specimens were examined for stress-strain behaviour using an Instron (RTM) 1122 tensile testing machine fitted with a Nene data analysis system. A clamp separation of 50 mm and a crosshead speed of 20 mm.min$^{-1}$ were used. Each sample consisted of 5 bars and an average value taken.

The variation of extension to break under applied stress expressed as a percentage of the untreated value is shown in Table 1.

TABLE 1

|  | Immediate | 1 day | 1 week | 1 month |
|---|---|---|---|---|
| Untreated | 100 | 10.0 | 5.4 | 4.4 |
| 100° C. | — | 17.5 | 11.3 | 11.8 |
| 120° C. | — | 56.7 | 15.2 | 12.1 |
| 140° C. | — | 46.6 | 36.7 | 13.4 |

Further measurements were taken at 84 days on the 140° C. treated samples which showed a variation of extension to break of 12.4% of the value for the untreated samples and at 385 days on the 100° C. treated samples which showed a variation of extension to break of 8.4% of the value for the untreated samples.

Conclusions

The untreated PHBV bars rapidly lost ductility and within one day elongation to break had been reduced to 10% of the original value of the untreated PHBV bars tested immediately after preparation. At one day after the heat treatment the PHBV bars treated at 100° C. were 50% more ductile than the untreated. The PHBV bars treated at 120° C. and 140° C. were approximately 5 times (400%) more ductile than the corresponding untreated PHBV bars. At one week after treatment the treated PHBV bars were 100%, 200% and 600% respectively more ductile than the untreated PHBV bars. At one month after treatment the treated PHBV bars were 150 to 200% more ductile than the untreated PHBV.

After 84 and 385 days the heat treated samples were still displaying improved resistance to applied stress compared to the untreated samples at even 1 month and in particular the 140° C. treated samples had hardly aged in the period from 1 month to 385 days.

The results clearly show that the aging of the PHBV bars was retarded after the heat treatment (as indicated by improved elongation to break values) compared to the untreated PHBV bars.

EXAMPLE 2

Comparison of Aged and Heat Treated PHBV Containing 5 mol % Valerate Units

This example was conducted as in Example 1 except for the following points:

PHBV copolymer powder ("BIOPOL" supplied by ICI) having Mw 720,000, Mw/Mn 3.14;

the maximum screw extruder temperature was 165° C.;

the cooling time was 20 seconds.

The variation of extension with applied stress (MPa) as a percentage of the untreated value is shown in Table 2.

TABLE 2

|  | 0 | 1 day | 1 week | 1 mth | 3 mths |
|---|---|---|---|---|---|
| Untreated | 100 | 18.4 | 16.6 | 15.6 | 8.0 |
| 100° C. | — | 37.0 | 31.6 | 22.1 | — |
| 140° C. | — | 75.8 | 51.5 | 34.0 | 33.6 |

Conclusions

The untreated PHBV bars rapidly lost ductility and within one day elongation to break had been reduced to 18% of the original value of the untreated PHBV bars tested immediately after preparation. At one day after the heat treatment the PHBV bars treated at 100° C. were 100% more ductile than the untreated bars at the same age. The PHBV bars treated at 140° C. were approximately 4 times (300%) more ductile than the corresponding untreated PHBV bars. At one week after treatment the treated PHBV bars were approximately 100% and 200% respectively more ductile than the untreated PHBV bars. At one month after treatment the treated PHBV bars were 50% and 120% respectively more ductile than the untreated PHBV.

The results clearly show that the aging of the PHBV bars was retarded after the heat treatment (as indicated by improved elongation to break values) compared to the untreated PHBV bars of the same age. A further interesting and useful feature of the heat treatment is that elongation to break values stabilise sooner and at a higher level than those of the untreated PHBV bars. The evidence for this can be seen from comparison of the 1 and 3 months values for the untreated and 140° C. treated PHBV bars.

EXAMPLE 3

Comparison of IZOD Impact Strength for Aged and Heat Treated PHBV Containing 8 mol % Valerate Units Injection moulded impact bars were prepared as described in Example 1, with the nozzle at 150° C., barrel zone 1 at 130° C., barrel zone 2 at 140°, injection time being 15 seconds, and the cooling time being 15 seconds. The bars were notched at 1 mm radius. IZOD impact strength was determined using a Zwick pendulum apparatus.

The heat treatment was applied to the impact bars 14 days after moulding. The bars were heated at 130° C. for 20 minutes (initially the temperature dropped to 112° C. and it took 15 minutes to reach the required temperature again). Five replicate bars were tested and the averaged values are given in $Jm^{-1}$. The results are given in Table 3.

TABLE 3

|  | 0 | 1 day | 7 days | 28 days |
|---|---|---|---|---|
| untreated | 93.75 | 58.75 | 51.25 | 31.25 |
| treated | 228.8 | 83.75 | 86.25 | 76.25 |

Conclusion

The heat treated bars were considerably more resistant to impact than the untreated bars. The impact results show a slowing down in the deterioration of the impact resistance for the treated bars and consequently at 28 days after treatment the treated bars are more than twice as resistant to impact than the untreated bars. The impact resistance of the untreated bars continues to deteriorate significantly over time.

EXAMPLE 4

Bottle Impact Performance Test.

Bottles were made from a formulation of PHBV containing 8% HV units, and 1 phr boron nitride by extrusion blow moulding with a Battenfield Fischer (35 mm). The bottles contained 380 ml (12 fl oz). The bottles were aged for 1 week before carrying out this test. A number of bottles were subjected to infra red heating for various times to give a bottle surface temperature between 125° and 130° C. The treated and untreated bottles were filled with water and conditioned for 24 hours at 22° C. The bottles were dropped from 48 inches (122 cm) onto a 1.3 cm (½ inch) steel plate angled at 5°. The results are given in Table 4.

TABLE 4

| Percentage of bottles surviving drop | |
|---|---|
| IR heating times (secs) | % bottle survival |
| 0 | 0 |
| 180 | 40 |
| 225 | 60 |
| 300 | 40 |

Conclusion

Bottle drop survival was significantly improved by the heat treatment compared to the non heat treated bottles.

We claim:

1. Process for producing, by extrusion, production of film, injection molding, thermoforming, an embrittlement-resistant shaped article at least partly made of a copolymer of polyhydroxyalkanoate (PHA), characterised by the succession of steps:

(a) producing as said PHA a plasticizer-free microbiologically produced polyester in the (R)-3-hydroxy form having units of formula —O—$C_mH_n$—CO— where n is 2 m and m is 4 to the extent of 4–20 mol %, the balance being m=3 units;

(b) shaping said PHA;

(c) ageing the resulting shape for the equivalent of at least 24 hours at 20° C. until a deterioration by more than 50% has taken place in ductility as measured by percentage elongation to break and/or IZOD impact strength; and (d) heating the so-aged shape at a temperature in the range 100° to 140° C. until its ductility as so measured has increased to at least 50% of its value before said ageing and has substantially stabilized at that increased level.

2. Process for improving and stabilising the mechanical properties of a shaped article at least partly made of plasticiser-free microbiologically produced polyester of a copolymer in the (R)-3-hydroxy form having units of formula —O—$C_mH_n$—CO— where n is 2 m and m is 4 to the extent of 4–20 mol %, the balance being m=3 units, in which ageing has occurred resulting in deterioration of ductility as measured by percentage elongation to break and/or IZOD impact strength; and which comprises heating it at a temperature in the range 100°–140° C. until its ductility as so measured has substantially increased and has substantially stabilised at that increased level.

3. Process according to claim 1 or claim 2 in which heating is for a period in the range 5 sec to 20 h.

4. Process according to claim 3 in which transfer of heat is by infra-red radiation.

5. A shaped article at least partly made of plasticiser-free microbiologically produced polyester of a copolymer in the (R)-3-hydroxy form having units of the formula —O—$C_mH_n$—CO— where n is 2 m and m is 4 to the extent of 4–20 mol %, the balance being m=3 units: characterised by substantial stability of percentage elongation to break and/or IZOD impact resistance.

6. A shaped article according to claim 5 wherein the produced polyester consists essentially of a copolymer of hydroxybutyrate units and hydroxyvalerate units.

7. A process according to claim 1 or claim 2 wherein the produced polyester consists essentially of a copolymer of hydroxybutyrate units and hydroxyvalerate units.

* * * * *